S. A. HOLMES.
CAMERA.

No. 10,987. Patented May 30, 1854.

Witnesses:
Lemuel W. Serrell
Thomas G. Harold

Inventor:
Silas A. Holmes

UNITED STATES PATENT OFFICE.

SILAS A. HOLMES, OF BROOKLYN, NEW YORK.

CAMERA FOR TAKING STEREOSCOPE OR OTHER DAGUERREOTYPES.

Specification of Letters Patent No. 10,987, dated May 30, 1854.

*To all whom it may concern:*

Be it known that I, SILAS A. HOLMES, of Brooklyn, in the county of Kings and State of New York, have invented and made certain new and useful Improvements in Cameras for Taking Daguerreotype and other Pictures; and I do hereby declare that the following is a full, clear, and exact description of the construction and operation of the same, reference being had to the annexed drawing, making part of this specification, wherein—

Figure 2:
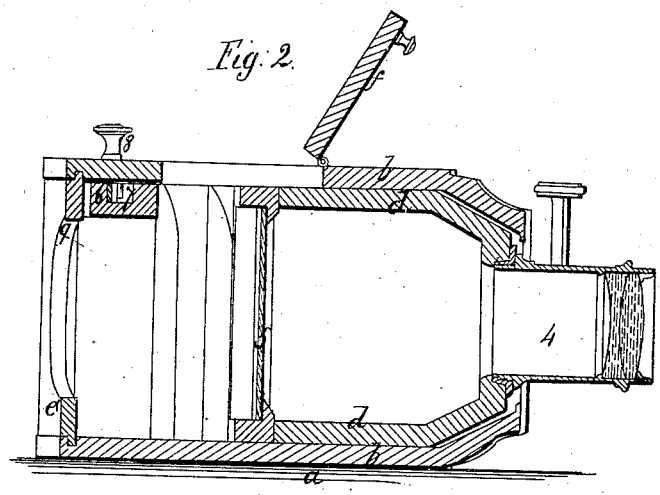
Figure 1:
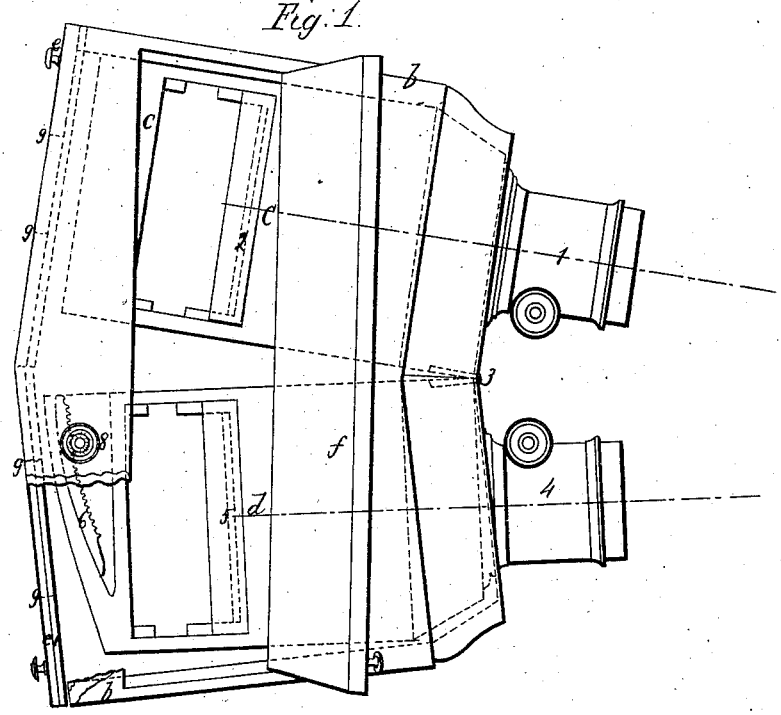

Figure 1, is a plan of the camera with a portion of the exterior case removed to show the parts. Fig. 2, is a section of the camera and adjustment to the same.

The like marks of reference denote the same parts in both figures.

The nature of my said invention consists in so attaching two camera boxes together that they are both adjusted vertically onto the object of which a picture is to be taken, and then the two cameras are directed onto the object in such a manner that two pictures can be taken of the same object at once for stereoscopes and other purposes.

In taking daguerreotype likenesses it is almost always necessary to take two views or pictures, in order to secure the best effect of light on the chemicals on the plate or to producing two pictures. Hence a large amount of time is wasted; whereas by the use of my double camera, two views can be taken in nearly the same time that one has heretofore occupied.

$a$, is a table or stand receiving the camera, which stand is to be adjusted by means of a screw or similar means as usual, so as to bring the axis of the camera to the required horizontal or inclined plane in the manner now usual.

$b$, is a box, made with the top and bottom parallel, but with the sides converging toward each other. Within this box a camera $c$, is attached so as to lie against one of the inclined sides, and this camera is fitted with the tube 1, and object glass 2, as usual; and at the front edge a hinge 3, connects the fixed camera box $c$, to a similar camera box $d$, so fitted that the camera box can be turned from a position adjacent to the box $c$, until the opposite side of the same coincides with the side of the box $b$. This camera box is fitted also with the lens tube 4, and slides 5, for the object glass or plate as usual.

6 is a curved rack attached to the top of the camera box $d$, and 7, is a pinion matching to the same, and 8, is a knob above the box by means of which the pinion is turned by the thumb and finger, and the camera moved to either side as required.

In using this instrument the operator first adjusts the whole apparatus vertically by the use of the bed $a$, as usual, so as to bring the same onto the required plane horizontally. He then directs the camera $c$, onto the object by turning the box the necessary amount, and adjusts the focus. He then turns the knob 8, until he brings the axis of the second camera $d$, on the vertical plane of the object to be taken, and having adjusted his focus by the tube as usual he removes the object glasses, inserting the chemically prepared plates or surfaces, and takes the two pictures at the same or nearly the same time.

$f$, is a flap or lid hinged on to afford access to the object glasses and plates, when inserted in the cameras.

$e$, and $e^1$ are slides set in grooves in the top and bottom of the box $b$, at the back of the same, and provided with openings 9, the object of which slides is to exclude as much light as possible from the back of the object glasses.

It will be evident that a screw might be used in place of the rack and pinion, to adjust the movable camera if found more convenient.

Figure 3:
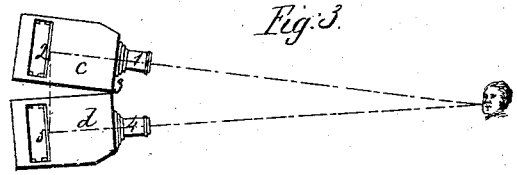

I do not claim the mere operation of taking two pictures with two cameras, but I am not aware that two camera boxes have ever been attached together at the forward edge to be directed onto one object to be taken, by which means the axes of the cameras are directed onto the same object, and the object glasses are always the same distance from the object, which would not be the case if the two cameras were not connected together, the axes of the cameras at the object glasses (or daguerreotype plate) forming an isosceles triangle to the object as indicated in Fig. 3, whether the object be near to or distant from the cameras.

Both cameras might be so fitted as to be adjusted in the inclosing box, but it is believed to be superfluous.

What I desire to secure by Letters Patent is—

I claim the attaching two camera boxes together at or near their front vertical edges, and adjusting one or both of said cameras onto the object of which a daguerreotype or other view is taken by means of the pinion and rack or its equivalent, for the purposes and as described and shown.

In testimony whereof I have hereunto set my signature, this twenty eighth day of April one thousand eight hundred and fifty four.

SILAS A. HOLMES.

Witnesses:
LEMUEL W. SERRELL,
THOMAS G. HAROLD.